Figure 1:
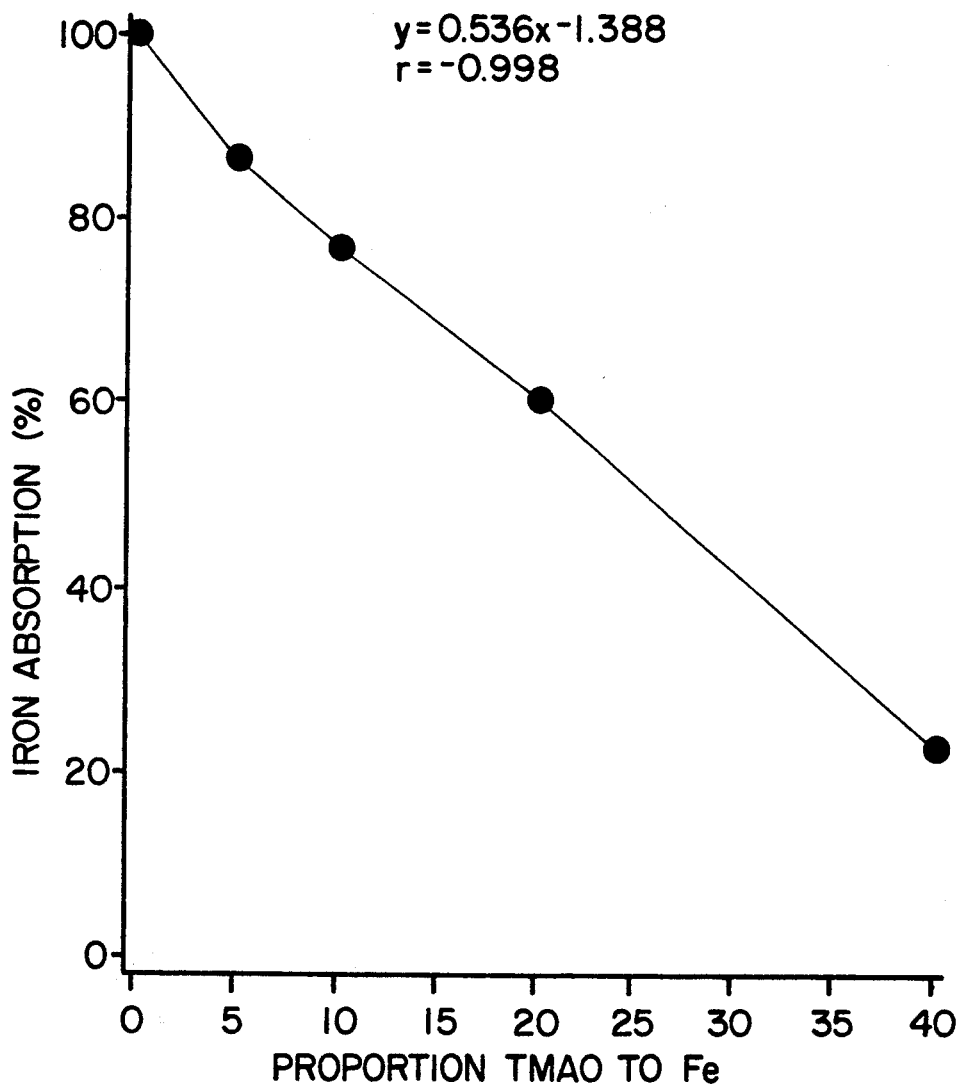
Figure 2A:
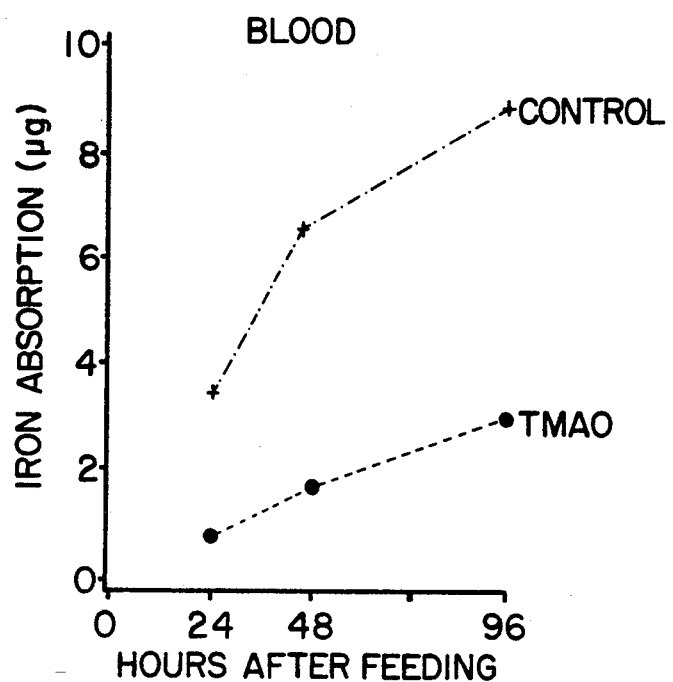
Figure 2B:
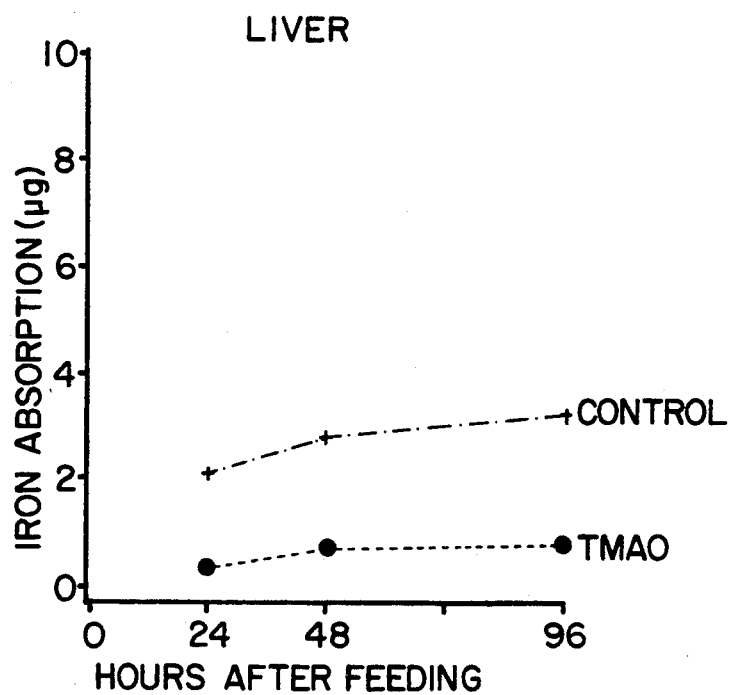
Figure 2C:
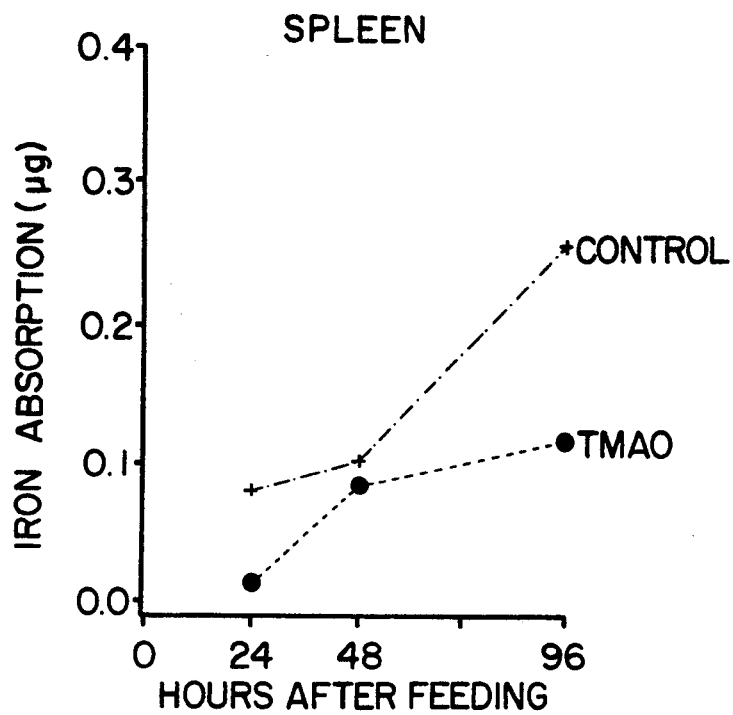
Figure 2D:
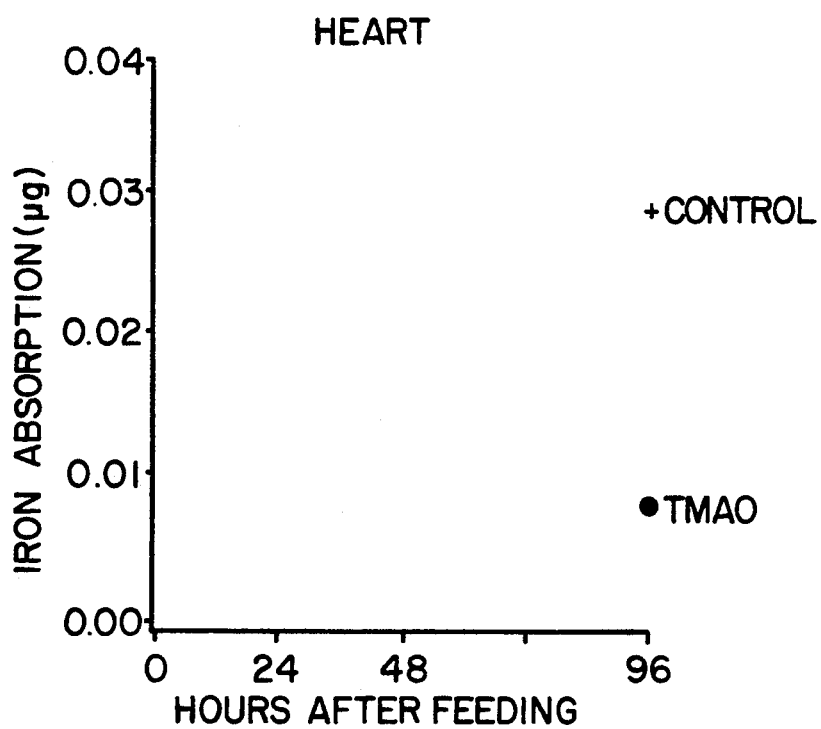

United States Patent [19]

Rorvik et al.

[11] Patent Number: 5,262,184
[45] Date of Patent: Nov. 16, 1993

[54] FEED AND FEED ADDITIVE FOR MARINE SPECIES AND CRAWFISH AND METHOD FOR THE PRODUCTION OF SAME

[75] Inventors: Kjell A. Rorvik, Oslo; Anders Skrede, As, both of Norway

[73] Assignee: Norsk Hydro a.s, Oslo, Norway

[21] Appl. No.: 816,735

[22] Filed: Jan. 3, 1992

[30] Foreign Application Priority Data

Jan. 14, 1991 [NO] Norway ................................. 910150

[51] Int. Cl.$^5$ ................................................ A23K 1/00
[52] U.S. Cl. ........................................... 426/72; 426/74; 426/601; 426/656; 426/658; 426/805
[58] Field of Search ...................... 426/2, 72, 74, 656, 426/658, 805, 601

[56] References Cited

U.S. PATENT DOCUMENTS 3,911,117 10/1975 Ender ..................................... 426/2

*Primary Examiner*—R. B. Penland
*Attorney, Agent, or Firm*—Wenderoth, Lind & Ponack

[57] ABSTRACT

The invention relates to a new feed, feed additive and method for production of feed for marine species. Trimethylamine oxide (TMAO) or deriviatives of same are formed to be powerful iron inhibitors when added to a conventional feed composition.

When used alone or in diluted dry or liquid form the amount needed to obtain an optional synergetic effect between iron and omega-3 fatty acids in the feed can be calculated according to a defined equation.

4 Claims, 4 Drawing Sheets

FEED AND FEED ADDITIVE FOR MARINE SPECIES AND CRAWFISH AND METHOD FOR THE PRODUCTION OF SAME

The present invention relates to a feed and a method for the production of a feed for marine species, fish and crawfish, as well as a special additive which reduces the availability of the mineral iron in the feed.

The abundant access to marine raw materials in the form of fish meal, has resulted in that the (Norwegian) aquaculture industry to a great extent has used such raw materials in feed blends. Additionally fish meal has proved to be especially well suited as a source of proteins in the feed. Analysis of commercial fish meal products show great variations in the iron content, normally from 140 to 300 mg total iron per kg meal. This is the main cause for the relatively high and varying content of iron in commercial fish feed products, where there are normal variations from 200 to 400 mg total iron per kg feed. Because iron in raw materials in general is less available, inter alia because of the content of phosphates, phytates and oxalates, than iron from animal raw materials, the use of marine raw materials has lead to a high content of bioavailable iron in feed used by the aquaculture industry. However, this has been considered as an additional advantages of using such raw materials for the production of fish feed.

In our prior patent application nr. EPO NO 902274 it was shown that the level of iron in the existing feed for farmed salmon is far too high, and that this will reduce the growth and even increase the risk for diseases.

To obtain an optimal synergy between iron and omega-3 fatty acids it was shown that even the lowest level of 120 mg total iron per kg feed can be too high, in spite of the fact that this level of iron is significantly lower than that which is generally considered as required. Cfr. Watanabe Nutrient requirements of cold water fishes, No 16, National Academy Press, Washington DC, 1981, where levels of iron from 250–400 mg iron/kg feed is recommended.

In carrying out additional tests we have now found that there is present approximately three times as much iron in the liver in cultured salmon as in the liver of wild salmon. Excess iron is stored in the liver rather than being used for heamoglobine synthesis. This confirms that there exists a significant iron unbalance in present day fish feed.

Thus, it is the object of the invention to provide a feed and to establish conditions for feeding which will lead to a reduction of the availability of the mineral iron in the feed in comparison with a standard feed.

To improve the iron balance it is necessary to reduce the amount of iron in the feed. A reduction of the iron content of the feed to approximately 100 mg / kg can be done by selecting and using commercial fish meal products having a lowest possible content of iron. Additionally there must be used mineral blends without iron addition. This very time consuming and economically costly method, appears today as the only possibility to produce a commercial fish meal based feed with an iron content of approximately 100 mg iron/kg dry feed.

Due to the fact that an additional lowering of the iron content is necessary, this can only be obtained through the use of specially selected protein products. This will make the feed so expensive that the whole farming business may be uneconomical. There may also occur a lack of suitable protein raw materials, at the same time as this will have negative economic consequences for the traditional fish meal producers.

Special studies have been initiated to, if possible, explain why farmed salmon which is fed traditionally has such a pronounced iron unbalance and a poorer health status than wild salmon.

There may basically be three explanations of the iron unbalance.

1. The wild fish is regulating its uptake of iron in an up to now unknown way.
2. There is too high content of iron in the feed.
3. The availability of the iron present in the feed is too high.

Our prior extensive investigations on farmed salmon seem to indicate that it does not have a regulating mechanism for iron uptake comparable with what is known from mammals. It is natural to assume that this will also apply for wild salmon and other wild fish species.

Because raw marine fish and crawfish is a natural feed for wild salmon and fish meal makes up a significant part of commercial fish feed, we have presumed that the main difference between the feed of wild salmon compared with farmed salmon is not the total content of iron only but also the availability of the iron present.

Chelators is a common denomination for all substances which are able to form complexes with iron, and thereby to reduce the availability of the mineral. Damaging effects caused by too high iron doses can therefor possibly be eliminated through the use of chelators or inhibitors for iron absorption and result in a greater part of the iron being excreted without being absorbed.

We have developed the hypothesis that the iron unbalance is created because the iron in commercial fish meal is more readily available than the iron in raw fish. The reason for this is that a raw marine fish has a high natural of the N-containing base trimethylamine-oxide (TMAO, $(CH_3)_3NO$). TMAO is known for its potent precipitation of iron. Because TMAO is naturally available in all marine fishes and crawfish, it is also a natural part of the feed used by the wild salmon.

Furthermore TMAO is detected in the intestines of fish, which is the place where the uptake of iron is occurring. A number of analyses have additionally shown that the TMAO content in fish will increase with decreasing sea temperatures With basis in our prior discoveries, cfr. the above mentioned patent application 902274, it is because of these low sea that it of special importance for the salmon to reduce the uptake of iron. The reason is that in vitro studies have shown, that the red blood cells will agglutinate and form a clot when the blood contains more iron than the transport mechanisms (serumtransferrin) can take care off. This can lead to thrombosis in the fish. Thrombosis is, according to our experience, probably the cause of winter ulcers in the fish. Winter ulcers are surface scars on the side of the salmon. By low sea temperatures they occur frequently and have detrimental economical consequences, because the ulcers give a high mortality and the slaughtered fish is degraded to production fish.

Thus, while wild fish is consequently taking up low amounts of iron from its natural feed, this is not the case for farmed salmon.

The reason for this is that TMAO in processed fish feed does not have the ability to precipitate iron. This is the case because TMAO undergoes changes by heating. Under production of fish meal, the fish is heated over prolonged time. During the feed production the raw material is additionally heated passing through an extruder or other processing apparatus followed by a final drying step of remove remaining water.

We have now surprisingly found that the addition of synthetic TMAO will in fact lower the iron absorption in farmed salmon. The salmon was fed with the iron isotope $^{59}$Fe, with or without addition of synthetic TMAO, and the blood was analyzed after 24 hours. We found marked lower radioactivity in those fishes which had received TMAO additive compared with those who did not receive TMAO additive. This illustrates that TMAO will lower the iron absorbtion in farmed salmon.

The marked difference between iron availability in raw and processed (cooked) fish is documented within the fur breeding industry. In this connection we refer to A. Skrede: Meldinger fra Norges Landcrukshgskole vol. 62, nr. 4. Here it is documented that mink fed with raw fish acquired anemia (low levels of blood haemoglobin) which caused white underfur, resulting in a product without economic value. Mink which were fed with boiled fish did however not develop anemia and had a normal fur.

The reason for this is that raw fish has a high content of active TMAO. TMAO caused anemia because free iron was transferred to undissolvable ironoxihydroxide. These experiences were made for the first time within the fur industry 20-25 years ago and relates to lack of bioavailable iron in mink feed.

Our new knowledge pertaining to the absence an iron uptake regulating mechanism in farmed salmon indicates that a feed for the fish farming industry will need a different approach: how can the amounts of bioavailable iron be reduced to obtain an optimal uptake of iron.

Thus it is the main object of the present invention to provide a fish feed where the amount of bio available iron can be controlled. Another object is to allow for the continued use of marine fish meal as a protein source for fish feed. Another object of the invention is to provide a fish feed and a method for producing it, where the amount of biolavailable iron is controlled to obtain an optimal synergetic effect between iron and the n-3 fatty acids present.

A further object of the invention is to provide an additive which can control the amount of bioavailable iron.

These and also other objects are obtained with the invention as defined in the accompanying patent claims and which is essentially characterized by the addition to and the use of TMAO in fish feed.

Figure 3:
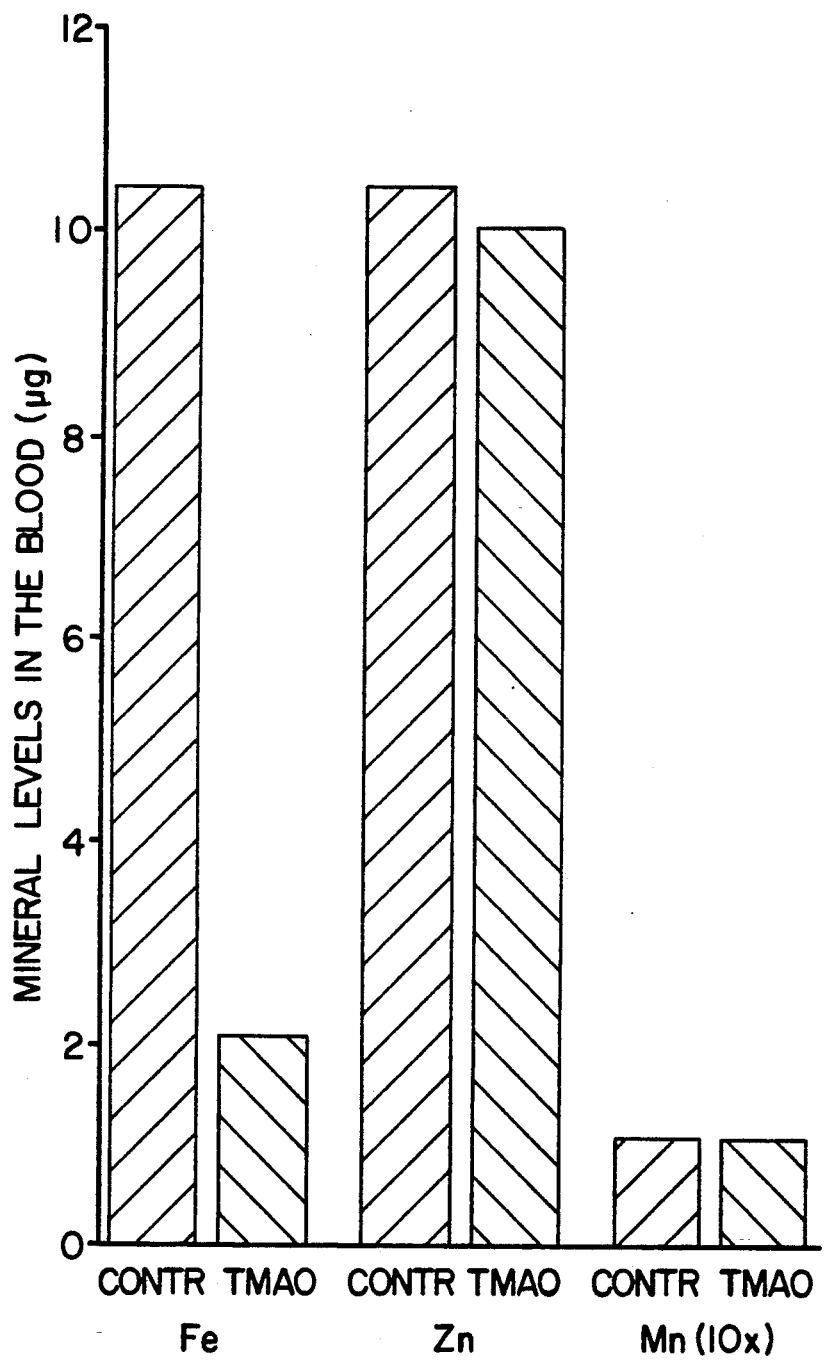

The invention will now be described in more detail in connection with the results obtained in experiments 1-3 and as illustrated in the drawings, where FIG. 1 shows the decreasing bioavailable of iron with increasing additions of TMAO, FIGS. 2a-2d show respectively, the reduced uptake of iron in the blood, liver, spleen and heart of farmed salmon when TMAO is present and FIG. 3 shows that TMAO shows a preference towards iron compared with other essential minerals such as zinc and manganese.

RESULTS

Trial 1

Twentyfive salmon were divided into 5 groups, each of 5 fish. They were all fed a solution of 200 μg ferrous iron and 5 different levels of TMAO : 0, 5, 10, 20 and 40 times the amount of iron. All fish were blood sampled after 24 hours for determination of content of radioiron in the blood. We observed a highly significant and linear correlation between iron absorbed and TMAO added in the final solution (r = −0.998, df =4, p<0.001, Table 1 and FIG. 1).

TABLE 1

Effect of increasing amount of TMAO in the feed solution on iron absorption in Atlantic salmon.

| Proportion TMAO to Fe | Number of fish | Uptake of iron in the blood g ± SD | Absorption relative to control |
|---|---|---|---|
| Control | 5 | 4.16 ± 1.04 | 100.0% |
| 5:1 | 4 | 3.60 ± 1.04 | 86.5% |
| 10:1 | 5 | 3.20 ± 0.60 | 76.9% |
| 20:1 | 5 | 2.52 ± 0.71 | 60.5% |
| 40:1 | 4 | 0.98 ± 0.78 | 23.6% |

Trial 2

The time of blood sampling may be critical. Therefore, to provide documentation of the total effects of TMAO on iron uptake, blood samples at different time intervals after feeding may be needed. In addition, it is urgent to measure the level of radioiron in liver and spleen of fish fed different levels of TMAO. If more radioiron is found in the spleen of fish fed no TMAO than in those fed TMAO, cell membrane damage in the red blood cells may be suggested.

Thirty salmon were divided into 2 groups of 15 fish each. All fish in the control group were administrated a feed solution of 200μg ferrous iron without any TMAO. The remaining fish were fed the same amount of iron together with 8 mg TMAO (TMAO : Fe =40 : 1).

Blood, liver and spleen were sampled from each group at 3 different time intervals after feeding :

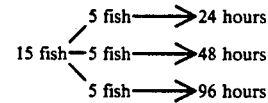

We observed reduced uptake of iron in blood, liver and spleen at all time intervals after feeding for fish fed TMAO (Table 2 and FIG. 2). The reduced uptake of iron in the TMAO group compared to the control group was significant at all time intervals and organs except for : blood after 48 hours (p<0.1), spleen after 48 hours and spleen after 96 hours (P<0.1).

Iron overload may be connected to heart disease in farmed Atlantic salmon. Therefore, the iron taken up by the heart after 96 hours was measured (Table 2). Fish fed TMAO in the diet had significantly reduced iron level in the heart compared to fish in the control group (p<0.005).

TABLE 2

Levels of iron in blood, liver, spleen and heart at different time intervals after feeding in Atlantic salmon fed an iron solution with and without TMAO.

| | | Sampling time after feeding | | |
|---|---|---|---|---|
| Organs | Treatment | 24 hours (μg ± SD) | 48 hours (μg ± SD) | 96 hours (μg ± SD) |
| Blood | Control | 3.43 ± 1.56 | 6.58 ± 4.85 | 8.85 ± 5.06 |
| Blood | TMAO | 0.81 ± 0.39 | 1.71 ± 1.74 | 2.93 ± 1.14 |
| Liver | Control | 2.18 ± 0.97 | 2.87 ± 0.65 | 3.31 ± 1.11 |
| Liver | TMAO | 0.42 ± 0.12 | 0.81 ± 0.66 | 0.84 ± 0.19 |
| Spleen | Control | 0.08 ± 0.05 | 0.11 ± 0.04 | 0.26 ± 0.15 |
| Spleen | TMAO | 0.02 ± 0.01 | 0.09 ± 0.07 | 0.12 ± 0.04 |
| Heart | Control | not sampled | not sampled | 0.029 ± 0.012 |

TABLE 2-continued

Levels of iron in blood, liver, spleen and heart at different time intervals after feeding in Atlantic salmon fed an iron solution with and without TMAO.

| Organs | Treatment | Sampling time after feeding | | |
|---|---|---|---|---|
| | | 24 hours (μg ± SD) | 48 hours (μg ± SD) | 96 hours (μg ± SD) |
| Heart | TMAO | not sampled | not sampled | 0.008 ± 0.002 |

The number of fish was 5 in each treatment, except for TMAO/24 hours and Control/48 hours where the number was 4.

Trial 3

In trial 1 and 2, the effect of TMAO on iron uptake without any influence of other minerals was studied. It is, however, of major importance to know if TMAO also affects the uptake of other minerals. Thus, we studied the effects of TMAO on a mixed diet containing radioactive isotopes of 3 different minerals.

Isotopes:
i) $^{65}$Zn
ii) $^{54}$Mn
iii) $^{59}$Fe

The fishes were fed a solution of 200 g iron, 150 g zinc and 50 g manganese each. Two treatments were used, control and TMAO. The amount of TMAO added was 40 times that of iron, 53 times that of zinc and 160 times that of manganese. The time of blood sampling was 24 hours after feeding In addition to the mixed mineral solution, individual studies were conducted for iron, zinc and manganese.

Fish fed TMAO and a mixed solution of all minerals had significantly reduced level of radioiron in the blood compared to fish in the control group ($p<0.001$). TMAO did not reduce the uptake of zinc and manganese (Table 3, FIG. 3)

In the experiment with one single mineral in solution, TMAO reduced the uptake as follows: iron = 82% (p21 0.05), zinc=30% (not significant) and manganese=69% (not significant).

TABLE 3

Effects of TMAO on a mixed feed solution of iron, zinc and manganese.

| Mineral | Treatment | Blood level (g) | Reduced absorption relative to control | Statistics |
|---|---|---|---|---|
| Iron | Control | 10.44 ± 3.18 | | |
| Iron | TMAO | 2.10 ± 1.10 | 80% | $p<0.001$ |
| Zinc | Control | 10.44 ± 2.05 | | |
| Zinc | TMAO | 10.05 ± 2.54 | 4% | n.s. |
| Manganese | Control | 0.12 ± 0.03 | | |
| Manganese | TMAO | 0.12 ± 0.09 | 0% | n.s. |

Standard fish feed compositions contain basically protein and lipids and some carbohydrates as main components. Additionally other components such as binding agents, preservatives, vitamins and minerals are added. The ingredients are mixed together in the required proportions and the mixing can be performed with or without the addition of water or liquid to produce a dry, soft or wet feed. As protein source there is preferably used fish meal and as lipid there is used marine fats and preferably fish oils or fish oil concentrates. The mineral mix used should be without iron additives. Even if it requires considerable skill and know-how to produce a high quality feed, the basic process is well known in the prior art and need not be described in detail here. By varying the amount of fish oil or fish oil concentrates used, the n-3 content of the feed can be adjusted to be in the area from 2.0% to 8.5% while the amount of iron will vary between 100-400 mg/kg dry feed depending on the selected raw materials. Also the pH of the feed should not be lower than 5.5, and preferably should be adjusted between 6-7.

The required amount of TMAO can be calculated on the basis of the curve and equation presented in FIG. 1. From regression equation, it may be estimated the amount of TMAO needed to reduce the uptake of iron the to desired level.

The TMAO is preferably in the form of trimethylamine-oxide modified molecules, or a derivative of same in dry or liquid form having the same function. TMAO can be added preferably in the form of a dry powder with various amounts of TMAO or mixed with a dry fish meal. Alternatively it can be dissolved and diluted in water or liquid and added to the feed mixture.

Based on the average content of iron and n-3 given above, using fish meal as protein source and fish oil as liquid source and a pH, of 6.0 the required amount of TMAO will be 3.8 g to obtain a reduction of iron from 150 to 75 mg/kg.

The importance of reducing the iron availability through the use of TMAO in the fish feed or through its use as an additive only related to farmed salmon but also applies for other farmed marine species, for feeding small fry as well as for feeding grown fish.

We claim:

1. In a feed for fish and crawfish which contains protein, lipids and carbohydrates in combination with one or more additional components mixed together to make up a dry, soft or wet feed with a content of n-3 fatty acids of from 2.0-8.5% based on the dry feed, the improvement consisting essentially of the feed and trimethylamine-oxide, said trimethylamine - oxide present in a controlled iron inhibiting effective amount based on the equation $y=0.536 \times 1.388$ wherein y is trimethylamine-oxide and x is iron content.

2. A feed according to claim 1, wherein the additional components are selected from the group consisting of fillers, adhesives, preservatives, vitamins and minerals.

3. A method for the production of a fish meal or feed for fish and crawfish, which comprises mixing together proteins, lipids, carbohydrates and one or more additional components, determining the feed's content of available iron, and adding trimethylamine-oxide to the mixture to reduce the availability of iron, so that there is obtained an optimal controlled content of available iron in the fish meal or feed based on the equation $y=0.536 \times -1.388$ wherein y is trimethylamine-oxide and x is iron.

4. A method according to claim 3 wherein the additional components are selected from the group c

* * * * *